(12) United States Patent (10) Patent No.: US 12,291,228 B2
Cserna et al. (45) Date of Patent: May 6, 2025

(54) POST DROP-OFF PASSENGER ASSISTANCE

(71) Applicant: Motional AD LLC, Boston, MA (US)

(72) Inventors: Bence Cserna, East Boston, MA (US); Alexander Brown, Dover, NH (US); Kevin C. Gall, Dover, NH (US)

(73) Assignee: Motional AD LLC, Boston, MA (US)

( * ) Notice: Subject to any disclaimer, the term of this patent is extended or adjusted under 35 U.S.C. 154(b) by 218 days.

(21) Appl. No.: 17/846,039

(22) Filed: Jun. 22, 2022

(65) Prior Publication Data
US 2023/0415764 A1 Dec. 28, 2023

(51) Int. Cl.
*B60W 50/00* (2006.01)
*B60Q 1/50* (2006.01)
*B60Q 9/00* (2006.01)
*B60W 50/16* (2020.01)
*B60W 60/00* (2020.01)
*B60W 50/14* (2020.01)

(52) U.S. Cl.
CPC .............. *B60W 50/16* (2013.01); *B60Q 1/507* (2022.05); *B60Q 9/008* (2013.01); *B60W 60/001* (2020.02); *B60W 2050/143* (2013.01); *B60W 2556/45* (2020.02)

(58) Field of Classification Search
CPC ............... B60W 50/16; B60W 60/001; B60W 2050/143; B60W 2556/45; B60W 60/00253; B60W 50/0098; B60Q 1/507; B60Q 9/008; G01C 21/3661; G06Q 10/0631; G06Q 50/40; G06Q 10/02; G06Q 90/20; G08G 1/202; G08G 1/005; G08G 1/163; G08G 1/166; G08G 1/167
See application file for complete search history.

(56) References Cited

U.S. PATENT DOCUMENTS 11,318,960 B1 5/2022 McKew
2016/0027307 A1* 1/2016 Abhyanker ............ G08G 1/005
 701/117
(Continued)

FOREIGN PATENT DOCUMENTS

KR 20210102501 A * 8/2021

OTHER PUBLICATIONS

International Search Report and Written Opinion received for PCT Patent Application No. PCT/US2023/068619, mailed on Sep. 14, 2023.

(Continued)

*Primary Examiner* — Justin Holmes
(74) *Attorney, Agent, or Firm* — Knobbe, Martens, Olson & Bear, LLP

(57) ABSTRACT

Provided are methods for post drop-off passenger assistance, which can include obtaining location data indicative of an environment where an autonomous vehicle is operating, determining a completion parameter indicative of a completion of a ride of the autonomous vehicle, determining, an assistance parameter indicative of an assistance of the autonomous vehicle to a passenger of the autonomous vehicle to be provided after the completion of the ride, and controlling an operation of the autonomous vehicle for assisting the passenger. Some methods described also include obtaining sensor data and controlling operation of the autonomous vehicle based on the sensor data. Systems and computer program products are also provided.

19 Claims, 6 Drawing Sheets

(56) References Cited

U.S. PATENT DOCUMENTS

2017/0316696 A1    11/2017   Bartel
2019/0375409 A1    12/2019   Hunt et al.
2020/0349848 A1*   11/2020   Bartel ............... B60W 50/0098

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
International Preliminary Report on Patentability received for PCT Patent Application No. PCT/US2023/0686, mailed on Jan. 2, 2025.

* cited by examiner

POST DROP-OFF PASSENGER ASSISTANCE

BACKGROUND

Autonomous vehicles are used for picking up and transporting a passenger from a first location to a second location, where the passenger is then dropped off. After dropping off the passenger, the autonomous vehicle can stop taking any action, such as if the passenger owns the autonomous vehicle, or can move to a second passenger for a second transportation, such as when the autonomous vehicle is being used as a ridesharing service.

DETAILED DESCRIPTION

Figure 1:
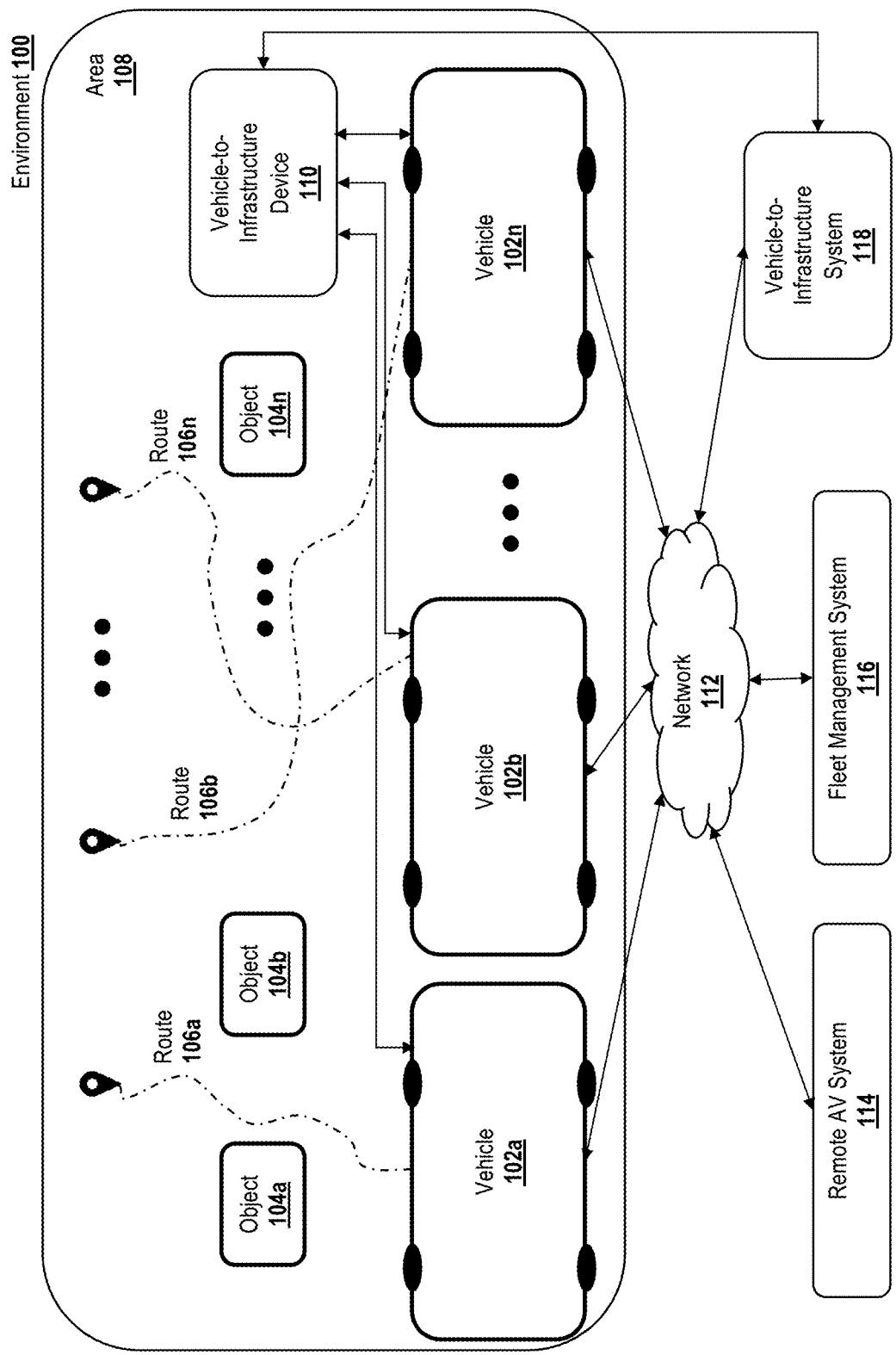
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships, or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This can refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

"At least one," and "one or more" includes a function being performed by one element, a function being performed by more than one element, e.g., in a distributed fashion, several functions being performed by one element, several functions being performed by several elements, or any combination of the above."

Some embodiments of the present disclosure are described herein in connection with a threshold. As described herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement methods and operations of controlling operation of an autonomous vehicle at completion of a ride, such as at and/or after drop-off of a passenger. In some embodiments or examples, a method comprises obtaining, using at least one processor, location data indicative of a location within an environment where an autonomous vehicle is operating. In some embodiments or examples, the method comprises determining, using the at least one processor, based on the location data, a completion parameter indicative of a completion of a ride of the autonomous vehicle. In some embodiments or examples, the method comprises determining, using the at least on processor, based on the location data and the completion parameter, an assistance parameter indicative of an assistance of the autonomous vehicle to a passenger of the autonomous vehicle to be provided after the completion of the ride. In some embodiments or examples, the method comprises controlling, using the at least one processor, based on the assistance parameter, an operation of the autonomous vehicle for assisting the passenger.

By virtue of the implementation of systems, methods, and computer program products described herein, techniques for passenger assistance at completion of a ride, such as at and/or after drop-off of a passenger. Advantages of these techniques can include improving autonomous vehicle safety for a passenger by controlling the autonomous vehicle. For example, controlling the autonomous vehicle can include providing notifications to the passenger and external notifications for remote assistance. For example, controlling the autonomous vehicle may include tracking a passenger leaving a vehicle within sensor range to ensure safety of the passenger. The techniques can further advantageously include the autonomous vehicle providing external notifications, which may allow a passenger to safely exit a vehicle. Moreover, the techniques can provide for improved passenger experience by controlling the autonomous vehicle to provide information that may be applicable to a particular passenger, e.g. an impaired passenger.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

Figure 6:
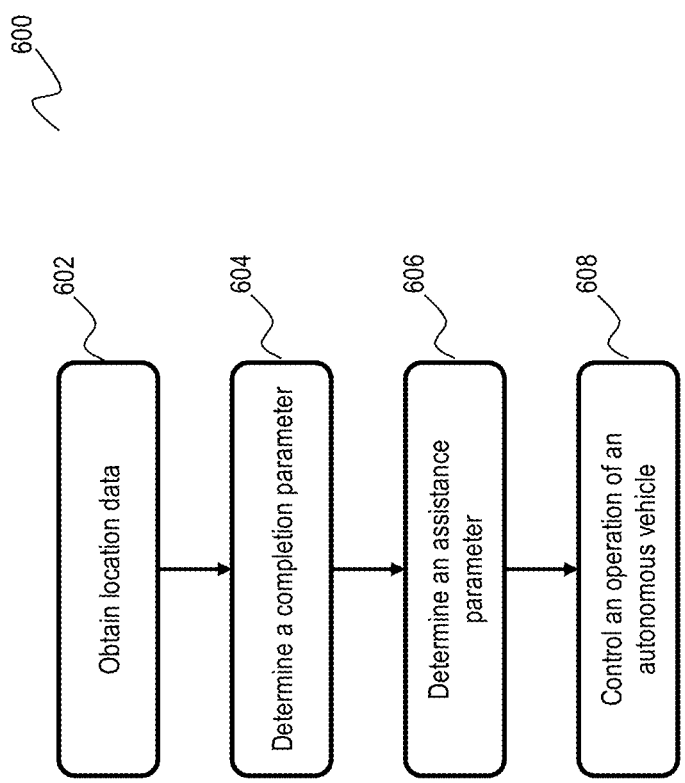
FIG. 6 is a flowchart of an example process for passenger assistance at completion of a ride.

In some embodiments, device 300 is configured to execute software instructions of one or more steps of the disclosed method, as illustrated in FIG. 6.

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
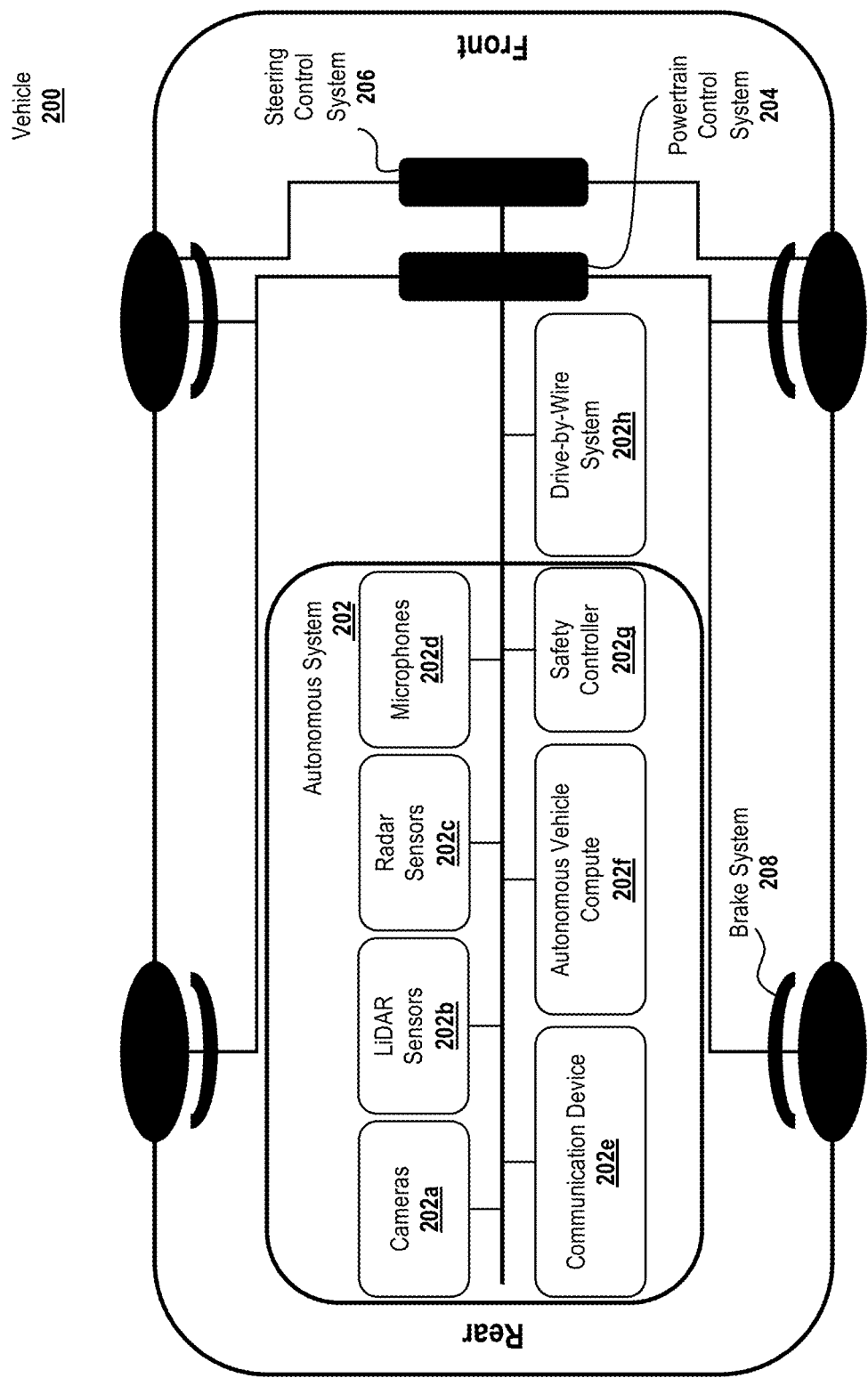
FIG. 2 is a diagram of one or more example systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 200 has autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202*a*, LiDAR sensors 202*b*, radar sensors 202*c*, and microphones 202*d*. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202*e*, autonomous vehicle compute 202*f*, and safety controller 202*g*.

Figure 3:
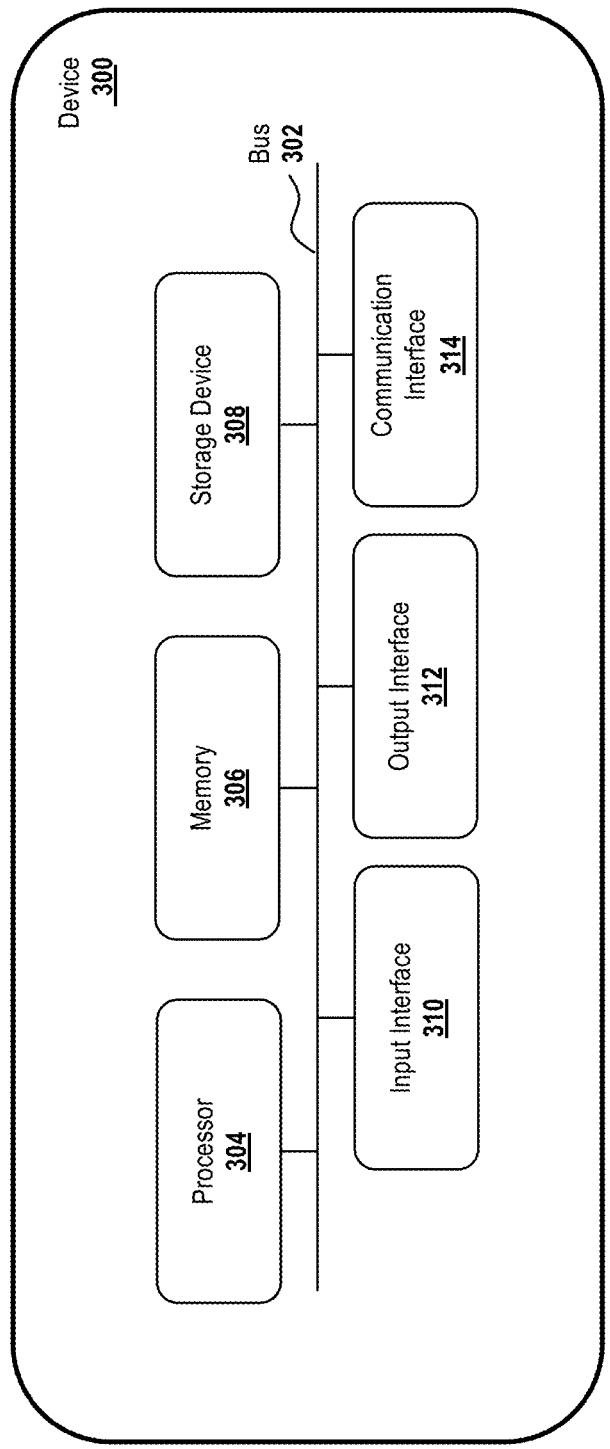
FIG. 3 is a diagram of components of one or more example devices and/or one or more example systems of FIGS. 1 and 2.

Cameras 202*a* include at least one device configured to be in communication with communication device 202*e*, autonomous vehicle compute 202*f*, and/or safety controller 202*g* via a bus (e.g., a bus that is the same as or similar to bus 302 of FIG. 3). Cameras 202*a* include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202*a* generates camera data as output. In some examples, camera 202*a* generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202*a* includes a plurality of independent cameras configured on (e.g., positioned on) a vehicle to capture images for the purpose of stereopsis (stereo vision). In some examples, camera 202*a* includes a plurality of cameras that generate image data and transmit the image data to autonomous vehicle compute 202*f* and/or a fleet management system (e.g., a fleet management system that is the same as or similar to fleet management system 116 of FIG. 1). In such an example, autonomous vehicle compute 202*f* determines depth to one or more objects in a field of view of at least two cameras of the plurality of cameras based on the image data from the at least two cameras. In some embodiments, cameras 202*a* is configured to capture images of objects within a distance from cameras 202*a* (e.g., up to 100 meters, up to a kilometer, and/or the like). Accordingly, cameras 202*a* include features such as sensors and lenses that are optimized for perceiving objects that are at one or more distances from cameras 202*a*.

In an embodiment, camera 202*a* includes at least one camera configured to capture one or more images associated with one or more traffic lights, street signs and/or other physical objects that provide visual navigation information. In some embodiments, camera 202*a* generates traffic light data associated with one or more images. In some examples, camera 202*a* generates TLD data associated with one or more images that include a format (e.g., RAW, JPEG, PNG, and/or the like). In some embodiments, camera 202*a* that generates TLD data differs from other systems described herein incorporating cameras in that camera 202*a* can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202*b* include at least one device configured to be in communication with communication device 202*e*, autonomous vehicle compute 202*f*, and/or safety controller 202*g* via a bus (e.g., a bus that is the same as or similar to bus 302 of FIG. 3). LiDAR sensors 202*b* include a system configured to transmit light from a light emitter (e.g., a laser transmitter). Light emitted by LiDAR sensors 202*b* include light (e.g., infrared light and/or the like) that is outside of the visible spectrum. In some embodiments, during operation, light emitted by LiDAR sensors 202*b* encounters a physical object (e.g., a vehicle) and is reflected back to LiDAR sensors 202*b*. In some embodiments, the light emitted by LiDAR sensors 202*b* does not penetrate the physical objects that the light encounters. LiDAR sensors 202*b* also include at least one light detector which detects the light that was emitted from the light emitter after the light encounters a physical object. In some embodiments, at least one data processing system associated with LiDAR sensors 202*b* generates an image (e.g., a point cloud, a combined point cloud, and/or the like) representing the objects included in a field of view of LiDAR sensors 202*b*. In some examples, the at least one data processing system associated with LiDAR sensor 202*b* generates an image that represents the boundaries of a physical object, the surfaces (e.g., the topology of the surfaces) of the physical object, and/or the like. In such an example, the image is used to determine the boundaries of physical objects in the field of view of LiDAR sensors 202*b*.

Radio Detection and Ranging (radar) sensors 202*c* include at least one device configured to be in communication with communication device 202*e*, autonomous vehicle compute 202*f*, and/or safety controller 202*g* via a bus (e.g., a bus that is the same as or similar to bus 302 of FIG. 3). Radar sensors 202*c* include a system configured to transmit radio waves (either pulsed or continuously). The radio waves transmitted by radar sensors 202*c* include radio waves that are within a predetermined spectrum In some embodiments, during operation, radio waves transmitted by radar sensors 202*c* encounter a physical object and are reflected back to radar sensors 202*c*. In some embodiments, the radio waves transmitted by radar sensors 202*c* are not reflected by some objects. In some embodiments, at least one data processing system associated with radar sensors 202*c* generates signals representing the objects included in a field of view of radar sensors 202*c*. For example, the at least one data processing system associated with radar sensor 202*c* generates an image that represents the boundaries of a physical object, the surfaces (e.g., the topology of the surfaces) of the physical object, and/or the like. In some examples, the image is used to determine the boundaries of physical objects in the field of view of radar sensors 202*c*.

Microphones 202*d* includes at least one device configured to be in communication with communication device 202*e*, autonomous vehicle compute 202*f*, and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of remote AV system 114, fleet management system 116, V2I system 118, and/or one or more devices of network 112 (e.g., one or more devices of a system of network 112). In some embodiments, one or more devices of vehicles 102 (e.g., one or more devices of a system of vehicles 102 such as at least one device of remote AV system 114, fleet management system 116, and V2I system 118, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
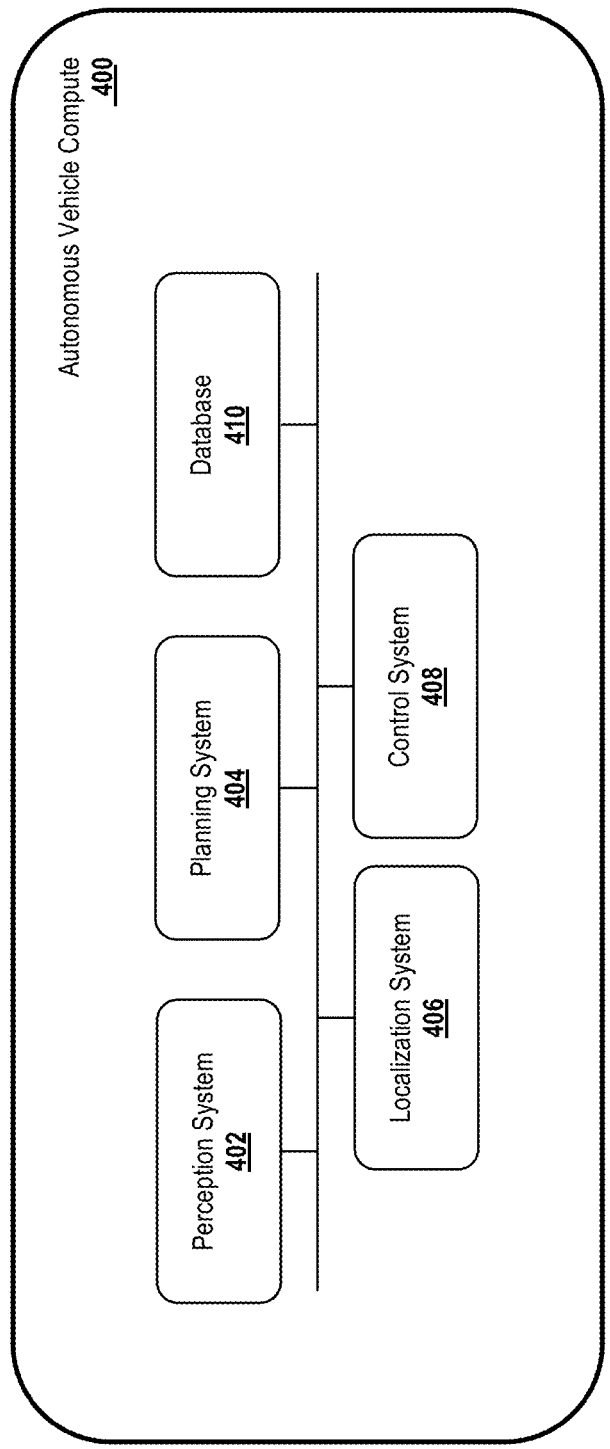
FIG. 4 is a diagram of certain components of an example autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202*f* of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

The present disclosure relates to systems, methods, and computer program products that can provide assistance to a passenger in an autonomous vehicle after a ride has ended, e.g. post drop off. The systems, methods, and computer program products can provide a number of different capabilities which can be used by a passenger and/or third parties, such as walking directions, tracking, third party integration, and safety protocols. The systems, methods, and computer program products can use both internal and external notification systems.

Disclosed herein are systems, methods, and computer program products that can provide for improved capabilities of an autonomous vehicle that can aid a passenger after completion of a ride. These systems, methods, and computer program products can improve the passenger experience and safety, such as by leveraging sensor capabilities of the autonomous vehicle. Example capabilities include one or more of: walking directions provided in-vehicle before completion, post drop-off passenger tracking to ensure safety (e.g. traffic light detection, safe crossing notification), help passenger vision and visibility by using the lights equipped on the vehicle, passenger emergency detection (falling, hostile activity), notification of third parties in case of (un/)successful trip, external notification for other road users that a passenger (with disability) is exiting the vehicle or crossing the road, and integration with third party credentials, e.g. a connected home/building.

Figure 5:
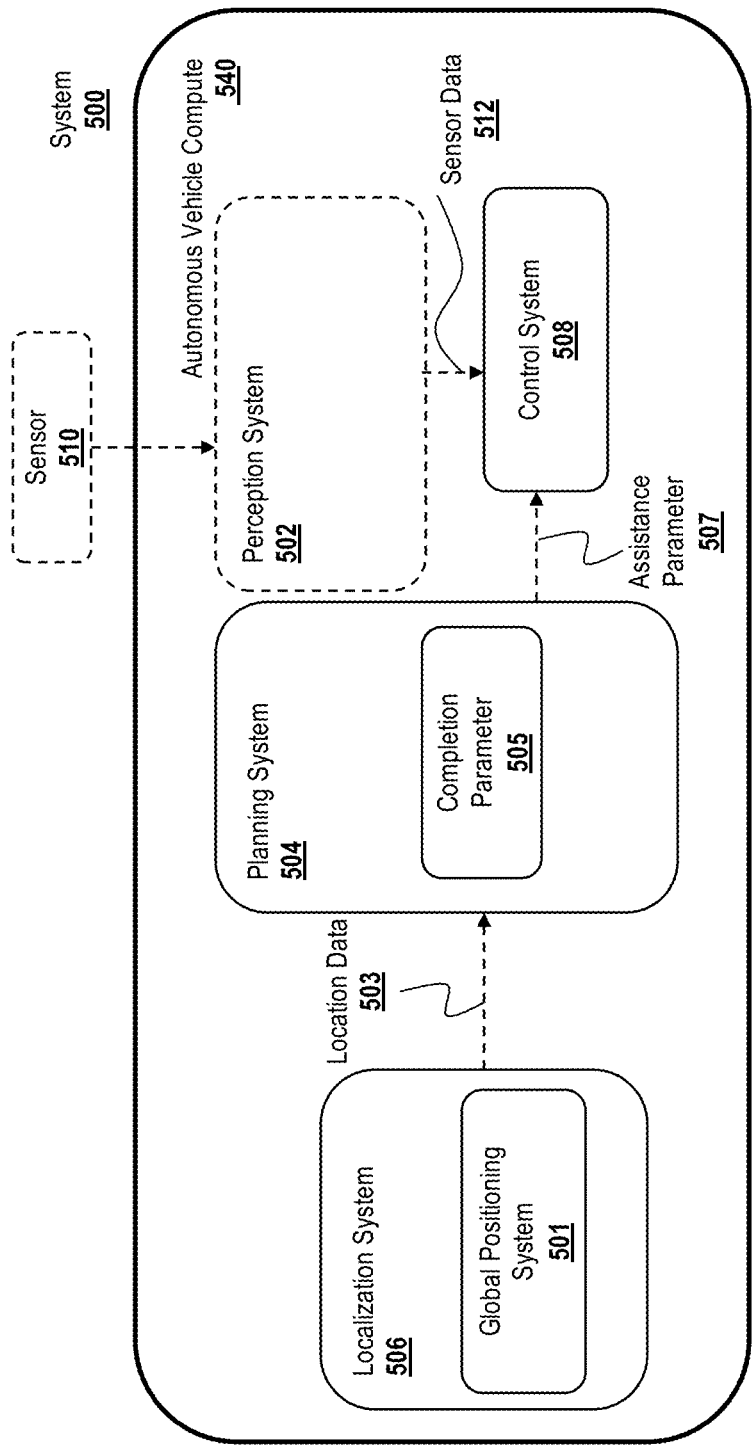
FIG. 5 is a diagram of an example implementation of a process for passenger assistance at completion of a ride.

Referring now to FIG. 5, illustrated is a diagram of an implementation of a process for passenger assistance at the completion of a ride, embodied by system 500. In some embodiments, the system 500 includes an AV compute 540 which is the same as or like systems described above, such as an autonomous system (e.g., a system that is the same as or like autonomous system 202 of FIG. 2), an AV compute (e.g. an AV compute that is the same as or like AV compute 202f of FIG. 2), a remote AV system (e.g., a remote AV system that is the same as or like remote AV system 114 of FIG. 1), AV compute 400 discussed with respect to FIG. 4, and/or a fleet management system (e.g., a fleet management system that is the same as or like fleet management system 116 of FIG. 1). For example, the system 500 and/or the AV compute 540 are part of an autonomous vehicle, such as autonomous vehicle 200 discussed with respect to FIG. 2. In one or more embodiments or examples, the AV compute 540 is part of the system 500. The AV compute 540 and/or the system 500, for example, includes one or more processors (such as processor 304 shown in FIG. 3). The AV compute 540 can be considered a processor.

For purposes of illustration, the following description of the system 500 for passenger assistance at the completion of the ride will be with respect to an implementation of this process by autonomous vehicle compute 540 (which can be the same as, or similar to, autonomous vehicle compute 400 of FIG. 4). However, it will be understood that in some examples the system 500 (e.g., one or more elements of the system 500) is implemented by other systems different from, or in addition to autonomous vehicle compute 540 such as an AV (e.g. illustrated in FIG. 2), an autonomous system (e.g., a system that is the same as, or similar to, autonomous system 202 of FIG. 2), a remote AV system (e.g., a remote AV system that is the same as, or similar to, remote AV system 114 of FIG. 1), and/or a fleet management system (e.g., a fleet management system that is the same as, or similar to, fleet management system 116 of FIG. 1).

In one or more embodiments or examples, the system 500 include one or more of: a localization system 506, a planning system 504, a perception system 502, and a control system 508 that are the same as, or similar to, the localization system 406, the planning system 404, the perception system 402, and the control system 408, respectively.

In one or more embodiments or examples, AV compute 540 obtains location data 503 indicative of a location within an environment where an autonomous vehicle is operating. In one or more embodiments or examples, the system 500, e.g. via the at least one processor, determines, based on the location data 503, a completion parameter 505 indicative of the end of a of a ride of the autonomous vehicle. In one or more embodiments or examples, the system 500, e.g. via the at least one processor, determines, based on the location data 503 and the completion parameter 505, an assistance parameter 507 indicative of an assistance of the autonomous vehicle to a passenger of the autonomous vehicle to be provided after the completion of the ride. In one or more embodiments or examples, the system 500, e.g. via the at least one processor, controls, based on the assistance parameter 507, an operation of the autonomous vehicle for assisting the passenger.

The assistance to the passenger can be called a passenger assistance. The passenger assistance, for example, includes a post drop-off assistance, and/or a drop-off assistance. As an example, the passenger assistance includes a post ride completion assistance, and/or a ride completion assistance. In one or more embodiments or examples, a passenger assistance is selected from one or more of: internal notifications (e.g., audio and/or visual cues within an autonomous vehicle), external notifications (e.g., audio and/or visual clues outside of an autonomous vehicle), collision detection, lost item detection, emergency warnings, and connections with third-party systems (e.g., smart homes). Passenger assistance can be any action taken by the autonomous vehicle which may aid a passenger upon ending a ride with an autonomous vehicle.

In one or more embodiments or examples, location data 503 is indicative of a location of the autonomous vehicle. For example, the location data 503 is indicative of a position within an environment where the autonomous vehicle is operating. In one or more embodiments or examples, the system 500 is configured to obtain location data 503 from a global positioning system 501, such as one or more of a global navigation satellite system, a positioning system, a navigation system, and the like. In one or more embodiments or examples, the system 500 obtains the location data 503 from a global positioning system 501 within the localization system 506, which can include one or more components of localization system 406 of FIG. 4.

In one or more embodiments or examples, the system 500 is configured to determine a completion parameter 505 indicative of a completion (e.g., end, finish), of a ride of the autonomous vehicle. In some embodiments, the completion parameter indicates that the ride is not complete. A completion of a ride may include an arrival at a destination and/or a drop-off of the passenger. In one or more embodiments or examples, the system 500 is configured to determine the completion parameter 505 based on the location data 503, e.g. based on a location of the autonomous vehicle within the environment. In one or more embodiments or examples, the system 500 determines the completion parameter 505 as part of the planning system 504, which can include one or more components of planning system 404 of FIG. 4.

The completion of a ride can be determined based on a destination. The destination is, for example, a requested destination and/or a target location. The destination can be obtained based on passenger input, such as a requested destination and/or a target location provided by the passenger, or obtained based on third party input, such as a requested destination and/or a target location provided by the third party. In one or more embodiments or examples, the system 500 is configured to obtain a destination, such as a requested destination and/or a target location. In one or more embodiments or examples, the system 500 is configured to determine, based on the location data, a completion of a ride by comparing the location data and the destination of the ride. In one or more embodiments or examples, the system 500 determines that the location data indicates that the autonomous vehicle is in vicinity (e.g. at or near) of the destination, and thereby determine the completion of the ride.

In one or more embodiments or examples, the system 500 is configured to determine a completion of a ride at an end of a ride, such as when the location data indicates that the autonomous vehicle arrives at a destination (e.g., target location). For example, the system 500 is configured to compare the location data 503 with the destination, such as requested destination and/or a target location. The destination can be the target location or different from a target location. For example, a destination is different from a target location if the requested destination is inaccessible to the vehicle and/or if the autonomous vehicle experiences a mechanical issue, causing the autonomous vehicle to be unable to continue.

In one or more embodiments or examples, the system 500 is configured to determine a completion of a ride when the location data 503 is indicative of the autonomous vehicle being within a threshold from the target location. The threshold can be a distance threshold. For example, the threshold is set at 1 mile from the target location. In one or more embodiments or examples, the system 500 is configured to determine the completion parameter 505 when the location data 503 is indicative that the autonomous vehicle is 1 mile or less from the target location. The threshold can be a distance from the target location. In one or more embodiments or examples, in accordance with a determination that the location data is indicative of a location satisfying the threshold, the system 500 determines the completion parameter indicative of a completion of the ride. In one or more embodiments or examples, in accordance with a determination that the location data is not indicative of a location satisfying the threshold, the system 500 determines the completion parameter indicative of a non-completion of the ride. For example, the threshold is satisfied when the location data is indicative of a location that meets or is less than the threshold. In one or more embodiments or examples, the system 500 is configured to determine a completion of a ride when the location data 503 is indicative of the autonomous vehicle being stopped.

In one or more embodiments or examples, the threshold from the target location is a time threshold. For example, the threshold is set at 5 minutes driving time from the target location. In one or more embodiments or examples, the system 500 is configured to determine the completion parameter 505 when the location data 503 is indicative that the autonomous vehicle is autonomous vehicle is 5 minutes driving time or less from the target location. In one or more embodiments or examples, in accordance with a determination that the location data is indicative of a location having a time to the target location satisfying the threshold, the system 500 determines the completion parameter indicative of a completion of the ride. In one or more embodiments or examples, in accordance with a determination that the location data is not indicative of a location having a time to the target location satisfying the threshold, the system 500 determines the completion parameter indicative of a non-completion of the ride. For example, the threshold is satisfied when the location data is indicative of a location having a time to the target location that meets or is less than the threshold.

In one or more embodiments or examples, the system 500 is configured to determine an assistance parameter 507 based on the location data 503 and/or the completion parameter 505.

In one or more embodiments or examples, the assistance parameter 507 is indicative of an assistance of the autonomous vehicle to a passenger of the autonomous vehicle to be provided at and/or after the completion of the ride. The assistance parameter 507 can be indicative of one or more operations of the autonomous vehicle that the system 500 is configured to control. A number of different assistances are discussed herein. For example, the assistance parameter 507 indicates one or more of: internal notification (e.g., audio and/or visual cues within an autonomous vehicle), external notification (e.g., audio and/or visual clues outside of an autonomous vehicle), collision detection, lost item detection, emergency warning, and connection with third-party systems (e.g., smart homes). For example, the assistance parameter 507 indicates a passenger assistance, such as any action taken by the autonomous vehicle which may aid a passenger upon ending a ride with an autonomous vehicle.

In one or more embodiments or examples, the system 500 is configured to determine an assistance parameter 507 based on one or more assistances of the autonomous vehicle, such as one or more assisting operations of the autonomous vehicle.

In one or more embodiments or examples, the system 500 is configured to control operation of the autonomous vehicle based on the assistance parameter 507. Controlling operation of the autonomous vehicle can be part of the control system 508, which can include any and or all components of control system 408. In one or more embodiments or examples, the system 500 is configured to control one or more operation of the autonomous vehicle. In one or more embodiments or examples, the system 500 is configured to control the operation by controlling one or more lights of the autonomous vehicle, and/or one or more output interfaces of the autonomous vehicle. In one or more embodiments or examples, the system 500 is configured to provide control data for control of an operation of the autonomous vehicle based on the assistance parameter 507.

In one or more embodiments or examples, the system 500 is configured to control operation of lights on the autonomous vehicle. Lights, in certain embodiments and examples, are standard lights incorporated in autonomous vehicles, such as one or more of headlights, taillights, cabin lighting, etc. Lights can be additional lights associated with the autonomous vehicle. For example, additional lighting is added onto external and/or internal areas of the autonomous vehicle, such as on the hood, window(s), door(s) or top of the autonomous vehicle. In one or more embodiments or examples, the assistance parameter 507 is indicative of controlling lights of the autonomous vehicle. In one or more embodiments or examples, the assistance parameter 507 includes one or more control parameters for controlling operations of the AV, such as controlling one or more lights, and/or one or more output interfaces.

The system 500 controlling operation of one or more lights can be advantageous for assisting vision and/or visibility of a passenger, such as by using the lights equipped on the autonomous vehicle. The visibility at a completion location of the ride of the autonomous vehicle, such as a drop-off location, can be limited, such as due to inclement weather and/or darkness. In one or more embodiments or examples, the system 500 is configured to turn on lights in order to provide visual aid to a passenger exiting the vehicle.

In one or more embodiments or examples, the system 500 is configured to control operation of the autonomous vehicle by controlling the direction of illumination of the one or more lights, such as to illuminate a specific region of the environment. In one or more embodiments or examples, the system 500 is configured to operate the autonomous vehicle to remain in place until the passenger leaves the scene, where the passenger would no longer need any further illumination. For example, the system 500 includes a time parameter indicative of a time period to control the operating of the autonomous vehicle to remain in place.

In one or more embodiments or examples, the system 500 is configured to control operation of the autonomous vehicle by controlling one or more output interfaces. For example, the system 500 controls a loudspeaker, which provides auditory information to the passenger before and/or exiting the autonomous vehicle. In one or more embodiments or examples, the assistance parameter 507 is indicative of controlling output interfaces of the autonomous vehicle. In one or more embodiments or examples, the system 500 is configured to control operation of one or more further output interfaces. Output interfaces include, for example, displays, audio devices, and mechanical devices. In one or more embodiments or examples, they system 500 is configured to control the operation by causing, using the at least one processor, based on the assistance parameter 507, a notification indicative of the assistance parameter 507 to be presented to the passenger or to another road user. The assistance parameter 507 can trigger a notification to be presented to the passenger or to another road user. For example, In one or more embodiments or examples, the system 500 is configured to control operation of the autonomous vehicle to execute a signaling behavior, such as a notification, such as physical signs and/or audio clues, for the autonomous vehicle that can be detectable to the passenger and/or external road users. In one or more embodiments or examples, the system 500 is configured to control operation of the autonomous vehicle to present the notification via a user interface module that can report audio and/or visual messages. For example, a notification includes information to be presented to a passenger and/or an external road user. In one or more embodiments or examples, the notification is one or more of an audio notification, a visual notification, a physical notification, a digital notification, and a computer notification.

In one or more embodiments or examples, the system 500 receives an instruction causing the notification to be presented by displaying, based on the assistance parameter 507, on a display device, a user interface object representative of the notification. The display device can be part of one or more of: the autonomous vehicle, and a part of a passenger device, such as a mobile device, such as a mobile phone. In one or more embodiments or examples, the system 500 receives an instruction causing an external notification and/or an internal notification to be presented to the passenger or to another road user, as part of the instruction causing the notification to be presented to the passenger or to another road user. In one or more embodiments or examples, the external notification is a notification external to the autonomous vehicle. This can include, for example, lights and/or signs and/or output devices on an outside of the autonomous vehicle. In one or more embodiments or examples, the external notification is used to assist a passenger with a disability. For example, the passenger of the autonomous vehicle is visually and/or auditorily impaired. The visually and/or auditorily impaired passenger may not perceive other road users upon exit from the autonomous vehicle, which can be dangerous to the passenger as well as the other road users. In one or more embodiments or examples, the external notification is a notification for other road users that a visually and/or auditorily impaired passenger is exiting the vehicle or crossing the road.

In one or more embodiments or examples, an autonomous vehicle arrives at a destination, such as at a target location, e.g., the system 500 determines a completion parameter 505 indicative of a completion of a ride, with a visually impaired passenger. In one or more embodiments or examples, the system 500 is configured to determine an assistance parameter 507 and control the operation of the autonomous vehicle based on the assistance parameter 507. In one or more embodiments or examples, the system 500 controls the operation of the autonomous vehicle to extend a physical sign on each side of the autonomous vehicle which provides a warning to other road users, such as by including text reciting "Caution: visually impaired person". Other road users overtaking the autonomous vehicle can see the physical sign and slow down and/or avoid doors of the autonomous vehicle. Instead of or in conjunction with the physical signs, the system 500 is configured to control operation of the autonomous vehicle to play an audio message from one or more external speakers of the autonomous vehicle to play audio of "visually impaired person exiting this vehicle; please use caution". Cyclists and/or pedestrians can then give the autonomous vehicle doors extra space. The visually impaired passenger can then safely exit the vehicle. While the discussion above is with respect to impaired passengers, the system 500 is not so limited. In one or more embodiments or examples, the system 500 is configured to control operation of the autonomous vehicle to provide a notification of a passenger exiting the autonomous vehicle.

In one or more embodiments or examples, an internal notification is a notification internal to the autonomous vehicle. In one or more embodiments or examples, internal notifications include notifications in a cabin of the autonomous vehicle. The internal notification is, for example, internal to the autonomous vehicle. An internal notification includes, for example, displaying on a display device and/or a screen in the autonomous vehicle. An internal notification can be an audio and/or visual notification for a passenger. In one or more embodiments or examples, the system 500 receives an instruction causing one or more of: a user interface object representative of the notification, a physical notification, an auditory notification, and a light-based notification, to be presented to the passenger or to another user.

The instruction is for example part of the instructions causing the notification to be presented to the passenger and/or to another road user. For example, the system 500 is configured to control operation of the autonomous vehicle by displaying the user interface object representative of the notification on a display device. In one or more embodiments or examples, the system 500 causes the user interface object representative of the notification to be displayed on a display device. In one or more embodiments or examples, the physical notification is a sign, such as a physical sign, such as a sign with text. In one or more embodiments or examples, the system 500 causes the physical notification to be presented to the passenger and/or to another road user. In one or more embodiments or examples, an auditory notification is provided by one or more external speakers playing a sound, such as a message. In one or more embodiments or examples, the system 500 causes the audio notification to be presented to the passenger and/or to another road user. A light-based notification can be provided by one or more lights associated with the autonomous vehicle turning on and/or turning off. In one or more embodiments or examples, the system 500 causes the light-based notification to be presented to the passenger and/or to another road user.

In one or more embodiments or examples, where a light-based notification is presented, the system 500 determines visibility in the environment. In one or more embodiments or examples, the system 500 is configured to turn on lights, such as headlights. In one or more embodiments or examples, the system 500 is configured to turn on additional lights of the autonomous vehicle. In one or more embodiments or examples, the system 500 is configured to illuminate a surface (e.g., the entire surface, a portion of the surface, a region along the surface, a region). In one or more embodiments or examples, the system 500 is configured to illuminate a surface so that text appears, such as the word "CAUTION".

In one or more embodiments or examples, the notification includes a navigation parameter indicative of one or more navigation directions to a target location. In one or more embodiments or examples, the navigation parameter is indicative of walking and/or bicycling navigation directions to a target location. In one or more embodiments or examples, the target location is a destination, e.g. after completion of the ride. The target location can be set by a passenger and/or a third party. In one or more embodiments or examples, the system 500 is configured to provide directions for a passenger from the location indicated by the location data 503 at the completion of the ride to the target location. In one or more embodiments or examples, the system 500 causes directions, such as navigation directions, to be presented to the passenger.

In one or more embodiments or examples, the system 500 receives, based on the assistance parameter, an instruction causing walking directions to be presented to the passenger. For example, when the assistance parameter indicates that the passenger is impaired, the system 500 displays walking directions on a built-in display, such as a screen, and/or using audio. In one or more embodiments or examples, the system 500 is configured to cause a highlighted crosswalk, such as via lights, to be presented to the passenger. In one or more embodiments or examples, the system 500 is configured to transmit walking directions to the passenger, such as to the passenger's mobile phone.

In one or more embodiments or examples, the system 500 is configured to cause landmarks and/or waypoint pictures to be presented to the passenger. In one or more embodiments or examples, the system 500 is configured to cause subway entrances with and/or without photographs to be presented to the passenger.

In some embodiments or examples, the system 500 is configured to cause directions to be presented to the passenger. For example, the system 500 can be configured to cause the directions to be presented to the passenger via a device (e.g., the passenger's device, an application executed on the passenger's device, and/or a navigation application and/or a ride-hailing application)

In one or more embodiments or examples, the system 500 is configured to control the operation by obtaining, using the at least one processor, sensor data 512 associated with an environment in which the autonomous vehicle is operating. In one or more embodiments or examples, the system 500 is configured to control the operation by controlling, based on the sensor data 512 and the assistance parameter 507, the operation of the autonomous vehicle.

In one or more embodiments or examples, the system 500 is configured to obtain sensor data 512 from a sensor 510, the sensor data 512 being associated with an environment in which the autonomous vehicle is operating. In one or more embodiments or examples, the system 500 includes one or more sensors 510. In one or more embodiments or examples, the sensor data 512 is one or more of: radar sensor data associated with a radar image, non-radar sensor data, camera sensor data, image sensor data associated with a camera image, audio sensor data associated with an audio signal, and LIDAR sensor data associated with a point cloud. The particular type of sensor data is not limiting. The sensor data 512 can be indicative of an environment around an autonomous vehicle. For example, the sensor data 512 is indicative of an object, and/or a plurality of objects, in the environment around an autonomous vehicle.

In one or more embodiments or examples, the sensor 510 is one or more sensors, such as an onboard sensor. The sensor 510 can be part of the perception system 502, which can include one or more components of perception system 402. In one or more embodiments or examples, the sensor 510 is associated with the autonomous vehicle. An autonomous vehicle can include one or more sensors that can be configured to monitor an environment where the autonomous vehicle operates, such as via the sensor 510, through sensor data 512. For example, the monitoring provides sensor data 512 indicative of what is happening in the environment around the autonomous vehicle, such as for determining trajectories of the autonomous vehicle. In one or more embodiments or examples, the sensors include one or more of the sensors illustrated in FIG. 2. The sensor 510 can be one or more of the sensors illustrated in FIG. 2. In one or more embodiments or examples, the sensor 510 is one or more of: a radar sensor, a non-radar sensor, a camera sensor, a microphone, an infrared sensor, an image sensor, and a LIDAR sensor. In one or more embodiments or examples, the sensor 510 can be selected from the group consisting of a radar sensor, a camera sensor, and a LIDAR sensor.

For example, sensor data 512 is indicative of a state of the passenger. Sensor data 512 can be indicative of a state of the passenger as provided by a perception system 502, a prediction system and/or a planning system 504 of the autonomous vehicle. In one or more embodiments or examples, the sensor data 512 includes passenger data.

In one or more embodiments or examples, the system 500 determines the assistance parameter 507 by determining, using the at least one processor, based on the sensor data 512, a collision parameter indicative of a potential collision in a vicinity of the autonomous vehicle at the completion of the ride. In one or more embodiments or examples, the system 500 determines the assistance parameter 507 by determining, using the at least one processor, based on the collision parameter, the assistance parameter 507. The assistance parameter 507 can trigger a controlling operation of the autonomous vehicle based on the collision parameter. For example, the assistance parameter 507 is determined based on the collision parameter. The collision parameter can be indicative of a potential collision. In one or more embodiments or examples, the system 500 is configured to determine the collision parameter using a prediction system.

In one or more embodiments or examples, the sensor data 512 is indicative of an object in the environment around the autonomous vehicle. For example, the sensor data 512 is indicative of a trajectory of the object in the environment. The sensor data 512 can be indicative of data associated with the passenger. In one or more embodiments or examples, the sensor data 512 is indicative of a trajectory of the passenger. In one or more embodiments or examples, the system 500 is configured to determine, such as predict, a trajectory of the passenger and/or an object indicated by the sensor data. In one or more embodiments or examples, the system 500 is configured to track a passenger, such as the state of the passenger and/or project the passenger's motion.

In one or more embodiments or examples, the system 500 is configured to determine whether there would be a potential collision between the passenger and an object in the environment. For example, the system 500 determines a potential collision in accordance with determining that the trajectory of the object is likely to intersect with a trajectory of the passenger. In one or more embodiments or examples, the system 500 is configured to determine a collision parameter indicative of a potential collision in accordance with an object indicated by the sensor data 512 satisfying a first threshold. For example, the system 500 is configured to determine a collision parameter indicative of a non-potential collision in accordance with an object indicated by the sensor data 512 not satisfying a first threshold. The first threshold may be a distance of the object from the autonomous vehicle. The first threshold may be a distance of the object from the passenger as indicated by the sensor data 512. The sensor data 512 may satisfy the threshold in accordance with the object being located at or below the threshold with respect to the autonomous vehicle and/or the passenger. The collision parameter can be advantageous for a passenger exiting the autonomous vehicle, such as at the completion of the ride. In one or more embodiments or examples, the system 500 is configured to control operation of the autonomous vehicle based on the collision parameter. For example, the system 500 is configured to advise a passenger, such as by causing a notification to be presented to the passenger, on the optimal side to exit the vehicle to avoid the potential collision.

In one or more embodiments or examples, the system 500 is configured to cause a notification to be presented to the passenger on the optimal side to exit the vehicle based on sensor data 512 indicative of the location of the sidewalk and/or oncoming traffic. For example, the system 500 is configured to cause a notification to be presented to the passenger to not exit the vehicle. In one or more embodiments or examples, the system 500 is configured to cause a notification to be presented to the passenger that the sensor data 512 is indicative of a median with a physical barrier on the road, for example advising a passenger when it is not safe to cross the road.

In one or more embodiments or examples, a passenger can exit the autonomous vehicle upon completion of the ride. In one or more embodiments or examples, the system 500 is configured to determine that sensor data 512 is indicative of limited visibility of the environment. In one or more embodiments or examples, the system 500 is configured to determine that the passenger would cross a road, such as based on a passenger destination input. In one or more embodiments or examples, the system 500 is configured to determine a collision parameter based on sensor data 512 indicative of cross traffic. In one or more embodiments or examples, if the system 500 determines that the collision parameter is indicative of a potential collision, the system 500 is configured to operate the autonomous vehicle to cause a notification to be presented to the passenger of a potential collision, such as by controlling the autonomous vehicle to active lights and/or audio, such as a horn, or transmitting the notification to the passenger's mobile phone. In one or more embodiments or examples, the system 500 is also configured to present an external notification to another road user, such as via controlling lights and/or physical signs of the autonomous vehicle, to warn other road users of the passenger.

For example, the system 500 is configured to cause a notification of sidewalk location to be presented to the passenger based on the assistance parameter 507. In one or more embodiments or examples, the system 500 is configured to cause a notification regarding which door to exit to be presented to the passenger based on the assistance parameter 507. In one or more embodiments or examples, the system 500 is configured to cause a notification of when it is and/or is not safe to exit the autonomous vehicle based on the assistance parameter 507.

In one or more embodiments or examples, the system 500 determines the assistance parameter 507 by determining, using the at least one processor, based on the sensor data 512, a return parameter indicative of a request of a return of the passenger to the autonomous vehicle. In one or more embodiments or examples, the system 500 determines the assistance parameter 507 by determining, using the at least one processor, based on the return parameter, the assistance parameter 507. The assistance parameter 507 can be indicative of controlling the autonomous vehicle based on the return parameter. In one or more embodiments or examples, the return parameter is indicative of a forgotten personal item. For example, the system 500 obtains sensor data 512 indicative of an unknown object in the autonomous vehicle, such as in the cabin of the autonomous vehicle. In one or more embodiments or examples, in accordance with the system 500 determining that there is an unknown object, the system 500 is configured to control operation of the autonomous vehicle by causing a notification indicative of the assistance parameter 507 to be presented to the passenger. The notification can indicate to the passenger to return to the vehicle. In one or more embodiments or examples, in accordance with the system 500 not determining that there is an unknown object, the system 500 is configured to control operation of the autonomous vehicle by causing a notification indicative of the assistance parameter 507 to not be presented to the passenger.

The return parameter can be indicative of a mistaken destination. For example, the system 500 obtains location data 503 indicative of a location different from a target location. In one or more embodiments or examples, in accordance with the system 500 determining that the location data 503 is indicative of a location different from the target location, the system 500 is configured to control operation of the autonomous vehicle by causing a notification indicative of the assistance parameter 507 to be presented to the passenger. The notification can indicate to the passenger to return to the vehicle. In one or more embodiments or examples, in accordance with the system 500 determining that the location data 503 is not indicative of a location different from the target location, the system 500 is configured to control operation of the autonomous vehicle by not causing a notification indicative of the assistance parameter 507 to be presented to the passenger.

In one or more embodiments or examples, the system 500 controls the operation by controlling, using the at least one processor, access of the passenger to the autonomous vehicle. For example, the system 500 is configured to control operation of the autonomous vehicle by providing access, such as one or more of unlocking a door, opening a door, and opening a window of the autonomous vehicle.

In one or more embodiments or examples, the system 500 determines the assistance parameter 507 by determining, using the at least one processor, based on the sensor data 512, an emergency parameter indicative of an emergency for the passenger. In one or more embodiments or examples, the system 500 determines the assistance parameter 507 by determining using the at least one processor, based on the emergency parameter, the assistance parameter 507. The emergency parameter can be indicative of an emergency for the passenger. For example, the sensor data 512 indicates an adverse environment for the passenger. For example, the sensor data 512 indicates that one or more of: the passenger has fallen, the passenger is experiencing a hostile activity, the passenger is experiencing a mugger, the passenger is experiencing an altercation, flooding, inclement weather, and a passenger signal that they need assistance. For example, the sensor data 512 indicates that one or more of another person has fallen, another person is experiencing a hostile activity, another person is experiencing a mugger, another person is experiencing an altercation, and another person's signal that they need assistance. In one or more embodiments or examples, the system 500 includes a database of emergencies. In one or more embodiments or examples, the system 500 uses machine learning to determine an emergency.

For example, in accordance with the determining that an emergency parameter is indicative of an emergency for the passenger, the system 500 is configured to control the autonomous vehicle to perform one or more of: to wait for a period of time to ensure passenger is safe at destination, to contact remote vehicle assistance operator to verify the emergency parameter, to contact emergency services, to contact a third party (e.g., an emergency contact that a passenger has on their account), to operate lights of the autonomous vehicle (e.g., to flash lights if the autonomous vehicles detects an assault, to illuminate an area between the passenger and the autonomous vehicle), to otherwise attempt to disrupt an assault, to reposition the autonomous vehicle closer to the passenger (e.g., if the passenger has moved along the road), and to prompt the passenger to return to the autonomous vehicle to escape unsafe situation, such as by causing a notification to be presented to the passenger.

In one or more embodiments or examples, the system is configured to determine the emergency parameter by obtaining, using the at least one processor, emergency information data indicative of a potential emergency from an external source. Potential emergencies can be seen as criminal emergencies, such as muggings or altercations in the environment. Potential emergencies can be seen as weather related emergencies, such as flooding, fog, and/or heavy rain. Potential emergencies can be fire based emergencies. Potential emergencies can be terrorist based emergencies.

In one or more embodiments or examples, the system 500 is configured to obtain the emergency data from an external source. An external source can be any source that contains information about potential emergencies such as, but not limited to, one or more of: news sources, police sources, firefighter sources, weather services, and government sources. An external source can be, but is not limited to, one or more of a policy database, a news database, a police database, a firefighter database, a government database, and a weather database.

In one or more embodiments or examples, the system is configured to control the autonomous vehicle by transmitting the assistance parameter 507 to an external device to cause the external device to operate according to the assistance parameter 507. In one or more embodiments or examples, the external device is any device capable of receiving the transmitted assistance parameter 507. For example, an external device can be one or more of: the passenger's phone, an application on a computing system, a server, and a third party's phone.

For example, the system 500 is configured to transmit the assistance parameter 507 to a third party's phone in case of a successful and/or unsuccessful ride. Advantageously, this can provide comfort and security to the third party. For example, the passenger is a child going to school and the third party is a parent. The parent can receive assurance that the child arrives safely. As another example, the passenger is an elderly and/or disabled patient returning home and the third party is a caregiver who can be notified to meet the patient outside.

In one or more embodiments or examples, the external device operates according to the assistance parameter 507 in a number of different ways. For example, the external device can operate by causing a notification indicative of the assistance parameter 507 to be presented, such as to an owner of the external device.

In one or more embodiments or examples, the system 500 prompts a passenger to enter contact information for a third party to allow the third party to receive notifications regarding the success or failure of the ride. In one or more embodiments or examples, upon determining the completion parameter 505, the system 500 is configured to transmit the assistance parameter 507 to the external device of the third party to cause a notification indicative of the success to be presented to by the external device. In one or more embodiments or examples, upon determining the completion parameter 505 is indicative of an unsuccessful trip, such as if the trip is cancelled or not completed, the system 500 is configured to transmit the assistance parameter 507 to the external device of the third party to cause a notification indicative of the failure to be presented to by the external device.

In one or more embodiments or examples, the external device is part of a third-party system. In one or more embodiments or examples, a third-party system is one or more of: a passenger's home, a passenger's building, an assistance system, and emergency system. A third-party system can be a system that performs an operation upon receiving the transmitted assistance parameter 507. The third-party system can require credential access with the system 500, and/or vice versa. The third party system, for example, is connected via internet protocols, and the system 500 connects to the third party via APIs. In the example of a smart home, the smart home vendor has public APIs that the system 500 connects to. In one or more examples or embodiments, the passenger enters credentials for their smart home into their ride-hailing app to activate the integration.

In one or more embodiments or examples, the system 500 obtains a passenger selection of the passenger's home as a target destination. In one or more embodiments or examples, the system 500 determines the completion parameter 505 and the assistance parameter 507. In one or more embodiments or examples, the system 500 controls the operation of the autonomous vehicle to transmit the assistance parameter 507 to a third-party system, for example the passenger's home with connected features. The assistance parameter 507 can indicate to the third party system to operate with "arrival settings" that have been set by the user. Upon receipt of the assistance parameter 507, the third-party system can perform operations such as one or more of unlocking doors, opening doors, turning on lights, and changing temperature.

The completion parameter 505 can be set at a particular time from the target destination, thus allowing for longer time horizons. For example, the third-party system performs an operation of turning the heat on when the system 500 controls the operation of the autonomous vehicle to transmit the assistance parameter 507 10 minutes away from the target location.

In one or more embodiments or examples, they system is configured to control the operation by controlling movement of the autonomous vehicle. These actions can be performed via a planning system 504 (such as planning system 404 of FIG. 4) and/or control system 508 (such as control system 408 of FIG. 4). For example, the system 500 is configured to control operation of the autonomous vehicle to remain stationary for a time period. For example, the system 500 is configured to control operation of the autonomous vehicle to exit a hostile place for drop off. In one or more embodiments or examples, the system 500 is configured to control operation of the autonomous vehicle such by one or more of: acceleration and trajectory of the autonomous vehicle. Advantageously, the system 500 can command the autonomous vehicle to remain stationary and/or command a trajectory in response to sensor data about a drop-off, rather than in response to receiving a new driving destination.

The system 500 is configured to control the operation by generating control data for a control system of an autonomous vehicle. The system 500 is configured to control the operation by providing control data to a control system of an autonomous vehicle. The system 500 is configured to control the operation by transmitting control data to, e.g., a control system of an autonomous vehicle and/or an external system. The system 500 is configured to control the operation by controlling, based on control data, a control system of an autonomous vehicle and/or an external system.

Referring now to FIG. 6, illustrated is a flowchart of a method or process 600 for passenger assistance at completion of a ride, such as for operating and/or controlling an AV, e.g. at completion of a ride. The method can be performed by a system disclosed herein, such as an AV compute 400, and a vehicle 102, 200, of FIGS. 1, 2, 3, 4 and system 500 and/or AV compute 540 of FIG. 5. The system 500 disclosed can include at least one processor which can be configured to carry out one or more of the operations of method 600. The method 600 can be performed (e.g., completely, partially, and/or the like) by another device or group of devices separate from or including system disclosed herein.

Disclosed herein is a method 600. In one or more embodiments or examples, the method 600 includes obtaining, at step 602, using at least one processor, location data indicative of an environment where an autonomous vehicle is operating. In one or more embodiments or examples, the method 600 include determining, at step 604, using the at least one processor, based on the location data, a completion parameter indicative of a completion of a ride of the autonomous vehicle. In one or more embodiments or examples, the method 600 includes determining, at step 606, using the at least on processor, based on the location data and the completion parameter, an assistance parameter indicative of an assistance of the autonomous vehicle to a passenger of the autonomous vehicle to be provided after the completion of the ride. In one or more embodiments or examples, the method 600 includes controlling, at step 608, using the at least one processor, based on the assistance parameter, an operation of the autonomous vehicle for assisting the passenger.

In one or more embodiments or examples, the completion parameter is indicative of a distance from completion of the ride. In one or more embodiments or examples, the completion of the ride is based on user input, such as a user destination.

In one or more embodiments or examples, controlling, at step 608, the operation includes controlling one or more lights of the autonomous vehicle, and/or one or more output interfaces of the autonomous vehicle.

One or more lights can assist vision and visibility of the passenger by using lights equipped on the vehicle. Output interfaces can include loudspeaker.

In one or more embodiments or examples, controlling, at step 608, the operation includes causing, using the at least one processor, based on the assistance parameter, a notification indicative of the assistance parameter to be presented to the passenger or to another road user.

For example, the method 600 includes displaying, based on the assistance parameter, on a display device, a user interface object representative of the notification. For example, the display device is part of the autonomous vehicle. The display device can be part of a passenger device, such as a mobile device.

In one or more embodiments or examples, causing the notification to be presented to the passenger or to another road user includes causing an external notification and/or an internal notification to be presented to the passenger or to another road user.

In one or more embodiments or examples, the external notification is external to the autonomous vehicle, such as to assist a passenger with a disability. An external notification can provide to other road users that a passenger is exiting the vehicle or crossing the road.

In one or more embodiments or examples, causing the notification to be presented to the passenger or to another road user includes causing one or more of: a user interface object representative of the notification, a physical, an auditory notification, and a light-based notification to be presented to the passenger or to another user.

In one or more embodiments or examples, a user interface object is displayed on a display device. A physical notification can be a physical sign, such as a sign with text. An auditory notification is, for example, external speakers playing a message. The method 600 can determine visibility of the environment, and then turn on lights of the autonomous vehicle, such as to illuminate a region and/or illuminate a surface so that "caution" appears on the surface.

In one or more embodiments or examples, the notification includes a navigation parameter indicative of one or more navigation directions to a target location.

In one or more embodiments or examples, the target location is set by the passenger.

In one or more embodiments or examples, controlling, at step 608, the operation includes obtaining, using the at least one processor, sensor data associated with an environment in which the autonomous vehicle is operating. In one or more embodiments or examples, controlling, at step 608, the operation includes controlling, based on the sensor data and the assistance parameter, the operation of the autonomous vehicle.

In one or more embodiments or examples, the sensor data is indicative of a state of the passenger as provided by a perception system, a prediction system and/or a planning system of the autonomous vehicle. Sensor data can include passenger data.

In one or more embodiments or examples, determining, at step 606, the assistance parameter includes determining, using the at least one processor, based on the sensor data, a collision parameter indicative of a potential collision in a vicinity of the autonomous vehicle at the completion of the ride. In one or more embodiments or examples, determining, at step 606, the assistance parameter includes determining, using the at least one processor, based on the collision parameter, the assistance parameter.

The potential collision can be for the passenger exiting the vehicle. For example, the assistance parameter leads to a notification regarding one or more of which door to exit, notification of sidewalk location, and notification of when it isn't safe to exit.

In one or more embodiments or examples, determining, at step 606, the assistance parameter includes determining, using the at least one processor, based on the sensor data, a return parameter indicative of a request of a return of the passenger to the autonomous vehicle. In one or more embodiments or examples, determining, at step 606, the assistance parameter includes determining, using the at least one processor, based on the return parameter, the assistance parameter.

A request of a return can be for a forgotten personal item and/or a mistaken destination.

In one or more embodiments or examples, controlling, at step 608, the operation includes controlling, using the at least one processor, access of the passenger to the autonomous vehicle.

For example providing access can include unlocking, opening a door, and/or keeping a door locked of the passenger to the autonomous vehicle In one or more embodiments or examples, determining, at step 606, the assistance parameter includes determining, using the at least one processor, based on the sensor data, an emergency parameter indicative of an emergency for the passenger. In one or more embodiments or examples, determining, at step 606, the assistance parameter includes determining using the at least one processor, based on the emergency parameter, the assistance parameter.

An emergency can be one or more of a passenger emergency, falling, hostile activity, mugging, altercation, disaster alert, flooding, weather, and passenger signal to autonomous vehicle that they need assistance.

Controlling, at step 608, can include one or more of waiting for some time to ensure passenger is safe at destination, contacting remote vehicle assistance operator to verify detection, contacting emergency services, and prompting passenger to return to vehicle to escape unsafe situation.

In one or more embodiments or examples, determining the emergency parameter includes obtaining, using the at least one processor, emergency information data indicative of a potential emergency from an external source.

In one or more embodiments or examples, the external source is one or more of a policy database, a news database, and a weather database.

In one or more embodiments or examples, controlling, at step 608, the operation includes transmitting the assistance parameter to an external device to cause the external device to operate according to the assistance parameter.

For example, the method 600 includes one or more of transmitting to a passenger's phone, transmitting to an app, and transmitting to 3rd parties in case of a successful/ unsuccessful trip.

In one or more embodiments or examples, the external device is part of a third-party system.

In one or more embodiments or examples, the third-party system is one or more of a passenger's home, a passenger's building, an assistance system, and an emergency system.

In one or more embodiments or examples, controlling, at step 608, the operation includes controlling movement of the autonomous vehicle.

In one or more embodiments or examples, controlling movement includes controlling the autonomous vehicle to remain stationary for a time period and/or to exit a hostile place for drop off.

Disclosed are non-transitory computer readable media comprising instructions stored thereon that, when executed by at least one processor, cause the at least one processor to carry out operations according to one or more of the methods disclosed herein.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/ sub-entity of a previously-recited step or entity.

Also disclosed are methods, non-transitory computer readable media, and systems according to any of the following items:

Item 1. A method comprising:
 obtaining, using at least one processor, location data indicative of an environment where an autonomous vehicle is operating;
 determining, using the at least one processor, based on the location data, a completion parameter indicative of a of a ride of the autonomous vehicle;
 determining, using the at least on processor, based on the location data and the completion parameter, an assistance parameter indicative of an assistance of the autonomous vehicle to a passenger of the autonomous vehicle to be provided after the completion of the ride; and
 controlling, using the at least one processor, based on the assistance parameter, an operation of the autonomous vehicle for assisting the passenger.

Item 2. The method of Item 1, wherein controlling the operation comprises controlling one or more lights of the autonomous vehicle, and/or one or more output interfaces of the autonomous vehicle.

Item 3. The method of any of Items 1-2, wherein controlling the operation comprises causing, using the at least one processor, based on the assistance parameter, a notification indicative of the assistance parameter to be presented to the passenger or to another road user.

Item 4. The method of Item 3, wherein causing the notification to be presented to the passenger or to another road user comprises causing an external notification and/or an internal notification to be presented to the passenger or to another road user.

Item 5. The method of any one of Items 3-4, wherein causing the notification to be presented to the passenger or to another road user comprises causing one or more of: a user interface object representative of the, a physical notification, an auditory notification, and a light-based notification to be presented to the passenger or to another user.

Item 6. The method of any one of Items 3-5, wherein the notification comprises a navigation parameter indicative of one or more navigation directions to a target location.

Item 7. The method of any one of Items 3-6, wherein controlling the operation comprises:
  obtaining, using the at least one processor, sensor data associated with an environment in which the autonomous vehicle is operating; and
  controlling, based on the sensor data and the assistance parameter, the operation of the autonomous vehicle.

Item 8. The method of Item 7, wherein determining the assistance parameter comprises:
  determining, using the at least one processor, based on the sensor data, a collision parameter indicative of a potential collision in a vicinity of the autonomous vehicle at the completion of the ride; and
  determining, using the at least one processor, based on the collision parameter, the assistance parameter.

Item 9. The method of any one of Items 7-8, wherein determining the assistance parameter comprises:
  determining, using the at least one processor, based on the sensor data, a return parameter indicative of a request of a return of the passenger to the autonomous vehicle; and
  determining, using the at least one processor, based on the return parameter, the assistance parameter.

Item 10. The method of any of the preceding Items, wherein controlling the operation comprises controlling, using the at least one processor, access of the passenger to the autonomous vehicle.

Item 11. The method of any one of Items 7-10, wherein determining the assistance parameter comprises:
  determining, using the at least one processor, based on the sensor data, an emergency parameter indicative of an emergency for the passenger; and
  determining using the at least one processor, based on the emergency parameter, the assistance parameter.

Item 12. The method of Item 11, wherein determining the emergency parameter comprises:
  obtaining, using the at least one processor, emergency information data indicative of a potential emergency from an external source.

Item 13. The method of any one of the preceding Items, wherein controlling the autonomous vehicle comprises transmitting the assistance parameter to an external device to cause the external device to operate according to the assistance parameter.

Item 14. The method of Item 13, wherein the external device is part of a third-party system.

Item 15. The method of any one of the preceding Items, wherein controlling the operation comprises controlling movement of the autonomous vehicle.

Item 16. A non-transitory computer readable medium comprising instructions stored thereon that, when executed by at least one processor, cause the at least one processor to carry out operations comprising:
  obtaining, using at least one processor, location data indicative of an environment where an autonomous vehicle is operating;
  determining, using the at least one processor, based on the location data, a completion parameter indicative of a of a ride of the autonomous vehicle;
  determining, using the at least on processor, based on the location data and the completion parameter, an assistance parameter indicative of an assistance of the autonomous vehicle to a passenger of the autonomous vehicle to be provided after the completion of the ride; and
  controlling, using the at least one processor, based on the assistance parameter, an operation of the autonomous vehicle for assisting the passenger.

Item 17. The non-transitory computer readable medium of Item 16, wherein controlling the operation comprises controlling one or more lights of the autonomous vehicle, and/or one or more output interfaces of the autonomous vehicle.

Item 18. The non-transitory computer readable medium of any of Items 16-17, wherein controlling the operation comprises causing, using the at least one processor, based on the assistance parameter, a notification indicative of the assistance parameter to be presented to the passenger or to another road user.

Item 19. The non-transitory computer readable medium of Item 18, wherein causing the notification to be presented to the passenger or to another road user comprises causing an external notification and/or an internal notification to be presented to the passenger or to another road user.

Item 20. The non-transitory computer readable medium of any one of Items 18-19, wherein causing the notification to be presented to the passenger or to another road user comprises causing one or more of: a user interface object representative of the notification, a physical notification, an auditory notification, and a light-based notification to be presented to the passenger or to another user.

Item 21. The non-transitory computer readable medium of any one of Items 18-20, wherein the notification comprises a navigation parameter indicative of one or more navigation directions to a target location.

Item 22. The non-transitory computer readable medium of any one of Items 18-21, wherein controlling the operation comprises:
  obtaining, using the at least one processor, sensor data associated with an environment in which the autonomous vehicle is operating; and
  controlling, based on the sensor data and the assistance parameter, the operation of the autonomous vehicle.

Item 23. The non-transitory computer readable medium of Item 22, wherein determining the assistance parameter comprises:
  determining, using the at least one processor, based on the sensor data, a collision parameter indicative of a potential collision in a vicinity of the autonomous vehicle at the completion of the ride; and
  determining, using the at least one processor, based on the collision parameter, the assistance parameter.

Item 24. The non-transitory computer readable medium of any one of Items 22-23, wherein determining the assistance parameter comprises:
determining, using the at least one processor, based on the sensor data, a return parameter indicative of a request of a return of the passenger to the autonomous vehicle; and
determining, using the at least one processor, based on the return parameter, the assistance parameter.

Item 25. The non-transitory computer readable medium of any of Items 16-24, wherein controlling the operation comprises controlling, using the at least one processor, access of the passenger to the autonomous vehicle.

Item 26. The non-transitory computer readable medium of any one of Items 22-25, wherein determining the assistance parameter comprises:
determining, using the at least one processor, based on the sensor data, an emergency parameter indicative of an emergency for the passenger; and
determining using the at least one processor, based on the emergency parameter, the assistance parameter.

Item 27. The non-transitory computer readable medium of Item 26, wherein determining the emergency parameter comprises:
obtaining, using the at least one processor, emergency information data indicative of a potential emergency from an external source.

Item 28. The non-transitory computer readable medium of any one of Items 16-27, wherein controlling the autonomous vehicle comprises transmitting the assistance parameter to an external device to cause the external device to operate according to the assistance parameter.

Item 29. The non-transitory computer readable medium of Item 28, wherein the external device is part of a third-party system.

Item 30. The non-transitory computer readable medium of any one of Items 16-29, wherein controlling the operation comprises controlling movement of the autonomous vehicle.

Item 31. A system, comprising at least one processor; and at least one memory storing instructions thereon that, when executed by the at least one processor, cause the at least one processor to:
obtain location data indicative of an environment where an autonomous vehicle is operating;
determine, based on the location data, a completion parameter indicative of a of a ride of the autonomous vehicle;
determine, based on the location data and the completion parameter, an assistance parameter indicative of an assistance of the autonomous vehicle to a passenger of the autonomous vehicle to be provided after the completion of the ride; and
control, based on the assistance parameter, an operation of the autonomous vehicle for assisting the passenger.

Item 32. The system of Item 31, wherein to control the operation comprises to control one or more lights of the autonomous vehicle, and/or one or more output interfaces of the autonomous vehicle.

Item 33. The system of any of Items 31-32, wherein to control the operation comprises to cause, using the at least one processor, based on the assistance parameter, a notification indicative of the assistance parameter to be presented to the passenger or to another road user.

Item 34. The system of Item 33, wherein to cause the notification to be presented to the passenger or to another road user comprises to cause an external notification and/or an internal notification to be presented to the passenger or to another road user.

Item 35. The system of any one of Items 33-34, wherein to cause the notification to be presented to the passenger or to another road user comprises to cause one or more of: a user interface object representative of the notification, a physical notification, an auditory notification, and a light-based notification to be presented to the passenger or to another user.

Item 36. The system of any one of Items 33-35, wherein the notification comprises a navigation parameter indicative of one or more navigation directions to a target location.

Item 37. The system of any one of Items 33-36, wherein to control the operation comprises:
to obtain, using the at least one processor, sensor data associated with an environment in which the autonomous vehicle is operating; and
to control, based on the sensor data and the assistance parameter, the operation of the autonomous vehicle.

Item 38. The system of Item 37, wherein to determine the assistance parameter comprises:
to determine, using the at least one processor, based on the sensor data, a collision parameter indicative of a potential collision in a vicinity of the autonomous vehicle at the completion of the ride; and
to determine, using the at least one processor, based on the collision parameter, the assistance parameter.

Item 39. The system of any one of Items 37-38, wherein to determine the assistance parameter comprises:
to determine, using the at least one processor, based on the sensor data, a return parameter indicative of a request of a return of the passenger to the autonomous vehicle; and
to determine, using the at least one processor, based on the return parameter, the assistance parameter.

Item 40. The system of any of Items 31-39, wherein to control the operation comprises to control, using the at least one processor, access of the passenger to the autonomous vehicle.

Item 41. The system of any one of Items 37-40, wherein to determine the assistance parameter comprises:
to determine, using the at least one processor, based on the sensor data, an emergency parameter indicative of an emergency for the passenger; and
to determine using the at least one processor, based on the emergency parameter, the assistance parameter.

Item 42. The system of Item 41, wherein to determine the emergency parameter comprises:
to obtain, using the at least one processor, emergency information data indicative of a potential emergency from an external source.

Item 43. The system of any one of Items 31-42, wherein to control the autonomous vehicle comprises to transmit the assistance parameter to an external device to cause the external device to operate according to the assistance parameter.

Item 44. The system of Item 43, wherein the external device is part of a third-party system.

Item 45. The system of any one of Items 31-44, wherein to control the operation comprises to control movement of the autonomous vehicle.

What is claimed is:
1. A method comprising:
obtaining, using at least one processor, first sensor data indicative of a first environment where an autonomous vehicle is operating;

determining, using the at least one processor, a completion parameter based at least in part on the first sensor data, wherein the completion parameter indicates that a passenger has exited the autonomous vehicle;

determining, using the at least one processor, an emergency parameter based at least in part on the completion parameter, wherein the emergency parameter indicates an emergency for the passenger;

determining, using the at least on processor, an assistance parameter based at least in part on the emergency parameter, wherein the assistance parameter is indicative of an action by the autonomous vehicle to provide assistance to the passenger of the autonomous vehicle after the passenger has exited the autonomous vehicle; and controlling, using the at least one processor, an operation of the autonomous vehicle to perform the action based at least in part on the assistance parameter.

2. The method of claim 1, wherein controlling the operation comprises controlling one or more lights of the autonomous vehicle, and/or one or more output interfaces of the autonomous vehicle.

3. The method of claim 1, wherein controlling the operation comprises causing, using the at least one processor, based on the assistance parameter, a notification indicative of the assistance parameter to be presented to the passenger or to another road user.

4. The method of claim 3, wherein causing the notification to be presented to the passenger or to another road user comprises causing an external notification and/or an internal notification to be presented to the passenger or to another road user.

5. The method of claim 3, wherein causing the notification to be presented to the passenger or to another road user comprises causing one or more of: a user interface object representative of the notification, a physical notification, an auditory notification, and a light-based notification to be presented to the passenger or to another user.

6. The method of claim 3, wherein the notification comprises a navigation parameter indicative of one or more navigation directions to a target location.

7. The method of claim 3, wherein controlling the operation comprises:

obtaining, using the at least one processor, second sensor data associated with a second environment in which the autonomous vehicle is operating; and controlling, based on the second sensor data and the assistance parameter, the operation of the autonomous vehicle.

8. The method of claim 7, wherein determining the assistance parameter comprises:

determining, using the at least one processor, based on the second sensor data, a collision parameter indicative of a potential collision in a vicinity of the autonomous vehicle after the passenger has exited the autonomous vehicle; and determining, using the at least one processor, based on the collision parameter, the assistance parameter.

9. The method of claim 7, wherein determining the assistance parameter comprises:

determining, using the at least one processor, based on the second sensor data, a return parameter indicative of a request of a return of the passenger to the autonomous vehicle; and determining, using the at least one processor, based on the return parameter, the assistance parameter.

10. The method of claim 1, wherein controlling the operation comprises controlling, using the at least one processor, access of the passenger to the autonomous vehicle.

11. The method of claim 1, wherein determining the emergency parameter comprises:

obtaining, using the at least one processor, emergency information data indicative of a potential emergency from an external source.

12. The method of claim 1, wherein controlling the autonomous vehicle comprises transmitting the assistance parameter to an external device to cause the external device to operate according to the assistance parameter.

13. The method of claim 12, wherein the external device is part of a third-party system.

14. The method of claim 1, wherein controlling the operation comprises controlling movement of the autonomous vehicle.

15. A non-transitory computer readable medium comprising instructions stored thereon that, when executed by at least one processor, cause the at least one processor to carry out operations comprising:

obtaining, using at least one processor, first sensor data indicative of a first environment where an autonomous vehicle is operating;

determining, using the at least one processor, a completion parameter based at least in part on the first sensor data, wherein the completion parameter indicates that a passenger has exited the autonomous vehicle;

determining, using the at least one processor, an emergency parameter based at least in part on the completion parameter, wherein the emergency parameter indicates an emergency for the passenger;

determining, using the at least one processor, an assistance parameter based at least in part on the emergency parameter, wherein the assistance parameter is indicative of an action by the autonomous vehicle to provide assistance to the passenger of the autonomous vehicle after the passenger has exited the autonomous vehicle; and controlling, using the at least one processor, an operation of the autonomous vehicle to perform the action based at least in part on the assistance parameter.

16. A system, comprising at least one processor; and at least one memory storing instructions thereon that, when executed by the at least one processor, cause the at least one processor to:

obtain first sensor data indicative of a first environment where an autonomous vehicle is operating;

determine a completion parameter based at least in part on the first sensor data, wherein the completion parameter indicates that a passenger has exited the autonomous vehicle;

determine an emergency parameter based at least in part on the completion parameter, wherein the emergency parameter indicates an emergency for the passenger;

determine an assistance parameter based at least in part on the emergency parameter, wherein the assistance parameter is indicative of an of action by the autonomous vehicle to provide assistance to the passenger of the autonomous vehicle after the passenger has exited the autonomous vehicle; and control an operation of the autonomous vehicle to perform the action based at least in part on the assistance parameter.

17. The system of claim 16, wherein to control the operation of the autonomous vehicle, the instructions cause the at least one processor to control one or more lights of the autonomous vehicle, and/or one or more output interfaces of the autonomous vehicle.

18. The system of claim 16, wherein to control the operation of the autonomous vehicle, the instructions cause the at least one processor to cause, using the at least one processor, based on the assistance parameter, a notification indicative of the assistance parameter to be presented to the passenger or to another road user.

19. The system of claim 18, wherein to control the operation of the autonomous vehicle, the instructions cause the at least one processor to:
  obtain, using the at least one processor, second sensor data associated with a second environment in which the autonomous vehicle is operating; and
  control, based on the second sensor data and the assistance parameter, the operation of the autonomous vehicle.

* * * * *

UNITED STATES PATENT AND TRADEMARK OFFICE
CERTIFICATE OF CORRECTION

| | | |
|---|---|---|
| PATENT NO. | : 12,291,228 B2 | Page 1 of 1 |
| APPLICATION NO. | : 17/846039 | |
| DATED | : May 6, 2025 | |
| INVENTOR(S) | : Bence Cserna et al. | |

It is certified that error appears in the above-identified patent and that said Letters Patent is hereby corrected as shown below:

On the Title Page

On Page 2, Column 1, Line 6, under item (56) Other Publications, delete "No. PCT/US2023/0686, mailed" and insert --No. PCT/US2023/068619, mailed--.

In the Specification

In Column 8, Line 43, delete "predetermined spectrum In" and insert --predetermined spectrum. In--.

In Column 16, Line 25, delete "of a of a ride" and insert --of a ride--.

In Column 18, Line 52, delete "any and or all" and insert --any and/or all--.

In Column 19, Line 51, delete "example, In one" and insert --example, in one--.

In Column 22, Line 10, delete "ride-hailing application)" and insert --ride-hailing application).--.

In Column 30, Lines 57-58, delete "of a of a ride" and insert --of a ride--.

In Column 32, Lines 14-15, delete "of a of a ride" and insert --of a ride--.

In Column 33, Line 48, delete "of a of a ride" and insert --of a ride--.

In the Claims

In Column 36, Claim 16, Line 59, delete "an of action" and insert --an action--.

Signed and Sealed this
First Day of July, 2025

Coke Morgan Stewart
*Acting Director of the United States Patent and Trademark Office*